United States Patent
Wang

(10) Patent No.: US 11,665,266 B2
(45) Date of Patent: May 30, 2023

(54) ROAMING BY BINDING A HOST WITH A DEVICE IDENTIFIER

(71) Applicant: New H3C Technologies Co., Ltd., Zhejiang (CN)

(72) Inventor: Wei Wang, Beijing (CN)

(73) Assignee: New H3C Technologies Co., Ltd., Zhejiang (CN)

(*) Notice: Subject to any disclaimer, the term of this patent is extended or adjusted under 35 U.S.C. 154(b) by 0 days.

(21) Appl. No.: 17/274,626

(22) PCT Filed: Sep. 12, 2019

(86) PCT No.: PCT/CN2019/105634
§ 371 (c)(1),
(2) Date: Mar. 9, 2021

(87) PCT Pub. No.: WO2020/052642
PCT Pub. Date: Mar. 19, 2020

(65) Prior Publication Data
US 2022/0021755 A1    Jan. 20, 2022

(30) Foreign Application Priority Data
Sep. 13, 2018   (CN) .......................... 201811066829.6

(51) Int. Cl.
*H04L 69/16* (2022.01)
*H04W 76/25* (2018.01)
*H04L 61/5014* (2022.01)

(52) U.S. Cl.
CPC ........ *H04L 69/169* (2013.01); *H04L 61/5014* (2022.05); *H04L 69/161* (2013.01); *H04W 76/25* (2018.02)

(58) Field of Classification Search
CPC . H04L 69/169; H04L 61/2015; H04L 69/161; H04W 76/25
See application file for complete search history.

(56) References Cited

U.S. PATENT DOCUMENTS

| 7,644,171 | B2* | 1/2010 | Sturniolo | ............ | H04W 80/045 |
| | | | | | 709/230 |
| 7,680,123 | B2* | 3/2010 | Veerepalli | ............. | H04W 80/04 |
| | | | | | 370/395.3 |

(Continued)

FOREIGN PATENT DOCUMENTS

| CN | 101128022 A | 2/2008 |
| CN | 101204071 A | 6/2008 |

(Continued)

OTHER PUBLICATIONS

J. Ylitalo, T. Jokikyyny, T. Kauppinen, A. J. Tuominen and J. Laine, "Dynamic network interface selection in multihomed mobile hosts," 36th Annual Hawaii International Conference on System Sciences, 2003. Proceedings of the, 2003, pp. 10 pp. -, doi: 10.1109/HICSS. 2003.1174876. (Year: 2003).*

(Continued)

*Primary Examiner* — Kamal B Divecha
*Assistant Examiner* — Alex H. Tran
(74) *Attorney, Agent, or Firm* — Greenblum & Bernstein, P.L.C.

(57) ABSTRACT

Roaming methods and hosts are provided. In the present disclosure, a TCP/IP connection established between a host and an opposite end is modified from binding a first IP address of the host in a current first network to binding a host address within the first IP address which does not change during host roaming, so that all parameters associated with the TCP/IP connection established between the host and the opposite end do not change when the host roams from the first network to a second network.

12 Claims, 2 Drawing Sheets

---

101

Bind a TCP/IP connection established between a host and an opposite end with a host address within a first IP address, so that the TCP/IP connection is maintained when the first IP address changes due to the host roaming from a first network to a second network

102

When the host roams from the first network to the second network, maintain, by the host, the TCP/IP connection, obtain, by the host, a second IP address of the host in the second network, and notify, by the host, the opposite end of the second IP address or a changed portion of the second IP address compared to the first IP address

(56) References Cited

U.S. PATENT DOCUMENTS

| | | | |
|---|---|---|---|
| 8,411,685 B1* | 4/2013 | Bennett, III | H04L 61/5014 370/392 |
| 10,212,583 B1* | 2/2019 | Hooda | H04L 45/021 |
| 2003/0182431 A1* | 9/2003 | Sturniolo | H04W 76/20 709/227 |
| 2003/0217145 A1* | 11/2003 | Leung | H04W 8/04 709/224 |
| 2003/0228868 A1* | 12/2003 | Turanyi | H04W 36/0011 455/432.1 |
| 2004/0179508 A1* | 9/2004 | Thubert | H04L 61/2592 370/349 |
| 2005/0013280 A1 | 1/2005 | Buddhikot et al. | |
| 2005/0074015 A1* | 4/2005 | Chari | H04L 12/2856 370/400 |
| 2007/0025305 A1* | 2/2007 | Denny | H04L 61/5014 370/400 |
| 2007/0047585 A1* | 3/2007 | Gillespie | H04L 63/02 370/475 |
| 2007/0070996 A1 | 3/2007 | Oran | |
| 2007/0189218 A1* | 8/2007 | Oba | H04W 36/12 370/331 |
| 2009/0022124 A1* | 1/2009 | Faccin | H04W 8/02 370/338 |
| 2010/0124231 A1* | 5/2010 | Kompella | H04L 61/5061 370/401 |
| 2010/0293250 A1* | 11/2010 | Ankaiah | H04W 12/088 709/227 |
| 2011/0061090 A1 | 3/2011 | Gillespie et al. | |
| 2012/0259991 A1* | 10/2012 | Rozinov | H04L 61/4535 709/228 |
| 2013/0103819 A1* | 4/2013 | Meyer | H04L 61/5007 709/223 |
| 2013/0103833 A1* | 4/2013 | Ringland | H04W 80/04 709/224 |
| 2013/0305332 A1* | 11/2013 | Narasimhan | H04W 36/0038 726/7 |
| 2015/0085734 A1* | 3/2015 | Nagaraja | H04L 12/4633 370/312 |
| 2015/0103804 A1* | 4/2015 | Gao | H04W 36/14 370/331 |
| 2015/0215773 A1* | 7/2015 | Bai | H04M 17/026 455/418 |
| 2015/0304363 A1* | 10/2015 | Garcia-Luna-Aceves | H04L 61/2539 709/227 |
| 2017/0086115 A1* | 3/2017 | Chung | H04L 41/40 |
| 2017/0223535 A1* | 8/2017 | Schell | H04W 12/06 |
| 2019/0363843 A1* | 11/2019 | Gordaychik | H04W 52/58 |
| 2021/0195500 A1* | 6/2021 | Choi | H04W 12/06 |
| 2021/0360490 A1* | 11/2021 | El-Rashidy | H04W 36/0016 |

FOREIGN PATENT DOCUMENTS

| | | |
|---|---|---|
| CN | 101686265 A | 3/2010 |
| CN | 102857985 A | 1/2013 |
| CN | 103873600 A | 6/2014 |
| CN | 105897712 A | 8/2016 |

OTHER PUBLICATIONS

Atkinson, R., Bhatti, S. & Hailes, S. ILNP: mobility, multi-homing, localised addressing and security through naming. Telecommun Syst42, 273 (2009). https://doi.org/10.1007/s11235-009-9186-5 (Year: 2009).*

Wozniak, J. Mobility management solutions for current IP and future networks. Telecommun Syst 61, 257-275 (2016). https://doi.org/10.1007/s11235-015-9999-3 (Year: 2016).*

State Intellectual Property Office of the People's Republic of China, Office Action and Search Report Issued in Application No. 2018110668296, dated May 8, 2020, 9 pages. (Submitted with Machine Translation).

State Intellectual Property Office of the People's Republic of China, Office Action and Search Report Issued in Application No. 2018110668296, dated Sep. 30, 2020, 7 pages. (Submitted with Machine Translation).

ISA State Intellectual Property Office of the People's Republic of China, International Search Report Issued in Application No. PCT/CN2019/105634, dated Dec. 2, 2019, WIPO, 4 pages.

European Patent Office, Extended European Search Report Issued in Application No. 19859679.3, dated Nov. 8, 2021, Germany, 10 pages.

* cited by examiner

ROAMING BY BINDING A HOST WITH A DEVICE IDENTIFIER

CROSS-REFERENCE TO RELATED APPLICATIONS

The present application claims priority to Chinese Patent Application No. 201811066829.6, entitled "ROAMING", filed on Sep. 13, 2018, the entire contents of which are incorporated herein by reference.

BACKGROUND

In network communication, a Transmission Control Protocol/Internet Protocol (TCP/IP) connection is established between a host (also referred to as a client) and a server. This connection is bound with an Internet Protocol (IP) address of the host, an IP address of the server, and the like.

In practical applications, the host may roam from a current network to another network. After the host roams to another network, it is required to modify the IP address of the host to ensure that data transmission to the host may be continued. The modified IP address belongs to an IP network segment corresponding to a network after roaming.

However, since the TCP/IP connection (the TCP/IP connection established between the host and the server) established by the host before roaming is bound with the IP address of the host before roaming, when the IP address of the host is modified after roaming, the TCP/IP connection established by the host before roaming will be interrupted. The host need to resume communication with the server by re-establishing a TCP/IP connection with the server according to a modified IP address.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE EMBODIMENTS

Figure 1:
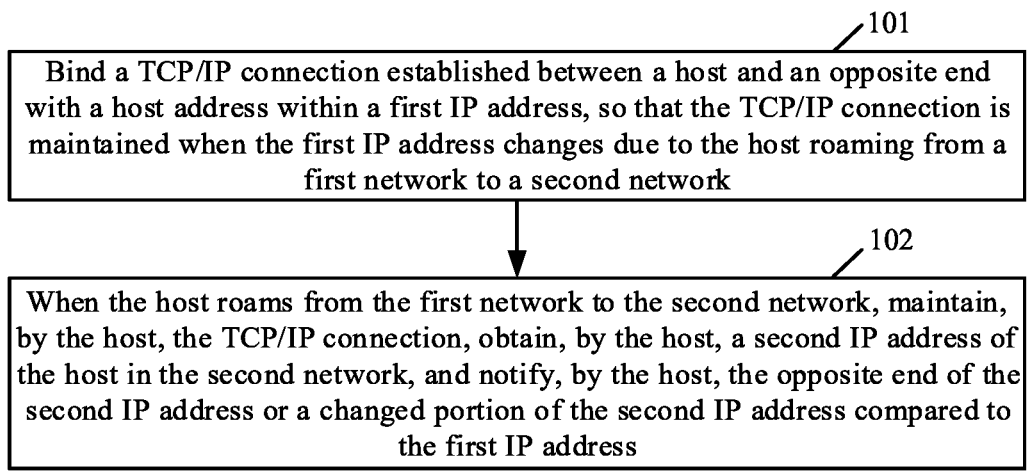
FIG. 1 is a flowchart of a method according to the present disclosure.

In network communication, a triangular routing method is usually adopted to ensure that a TCP/IP connection established by a host before roaming is not interrupted due to host roaming, thereby allowing the host to maintain uninterrupted communication after roaming, which will be described below.

In the triangular routing method, when the host roams from one network (referred as a source network) to another network (referred as a destination network), the IP address of the host is not modified. Instead, notification the roam from a router (referred as a destination router) accessed by the host in the destination network is received by a router (referred as a source router) accessed by the host in the source network. If receiving a packet (a destination IP address of the packet is the IP address of the host) sent to the host, the source router forwards the packet to the destination router, so that the destination router forwards the packet to the host. Because the packet arrives at the host through the source router and the destination router, this process is called triangular routing.

In the triangular routing method, one hop (from the source router to the destination router) is added. Thus, the efficiency of forwarding a packet is not high.

To improve the efficiency of forwarding a packet in the triangular routing method, an overlay manner may also be adopted. Specifically, when a host roams from a source network to a destination network, an IP address of the host is not modified, the host needs to registered with a gateway connected to the destination network, and the gateway advertises an IP address of the destination router accessed by the destination network associated with the host based on a Border Gateway Protocol (BGP). In this way, when receiving a packet sent to the host, other routers do not directly forward the packet based on the destination IP address of the packet (the IP address of the host), but firstly query the IP address of the destination router, and then encapsulate the packet into a Virtual extensible Local Area Network (VxLAN) packet, for example, a User Datagram Protocol//Internet Protocol (UDP/IP) connection is used, where a destination IP address of the VxLAN packet is the IP address of the destination router. After receiving the packet, the destination router takes out a payload in the VxLAN packet and sends the payload to the host.

Thus, the problem of the triangular routing may be avoided in the overlay manner. However, since the gateway advertises the IP address of the destination router associated with the host after roaming, it is required to establish a forwarding entry for each host in a routing table. As the scale of the hosts increases, the resource of the routing table will be consumed greatly.

To avoid the problem caused by the above triangular routing method and the overlay manner, the present disclosure provides a new method for maintaining uninterrupted communication after host roaming. The method can ensure that a TCP/IP connection established by the host before roaming is not interrupted due to the host roaming, and communication is not interrupted after the host roams, which will be described below in combination with FIG. 1.

FIG. 1 is a flowchart of a method according to the present disclosure. The method may be applied to a host. Herein, in an example, the host may be a client or other devices.

It is assumed that the host is in a first network currently. Herein, the first network is named only for convenience of descriptions rather than limitation.

As shown in FIG. 1, the method may include the following blocks.

At block 101, a TCP/IP connection established between the host and an opposite end is bound with a host address within a first IP address, so that the TCP/IP connection is maintained when the first IP address changes due to the host roaming from a first network to a second network.

In the present disclosure, the first IP address is an IP address of the host in the first network and includes a network address and the host address. The network address indicates a network segment where the host is located, and the host address indicates a device identifier of the host for uniquely identifying the host. If the first IP address is, for example, an IPv6 address, the first 64 bits of the IPv6 address indicate the network address and the remaining 64 bits indicate the host address.

In an existing TCP/IP, a TCP/IP connection established between a host and an opposite end (for example, a server) can be bound with an IP address of the host in a current network and other parameters, such as the IP address of the server. The IP address bound with the TCP/IP connection is different from other parameters. The IP address bound with the TCP/IP connection may change as the host roams to a different network, and other parameters bound with the TCP/IP connection do not change during the host roaming. In the present disclosure, a management mechanism of the TCP/IP connection is improved as follows. A TCP/IP connection established between the host and the server is no longer bound with the first IP address of the first network where the host is currently located. Instead, the binding is modified to be bound with the host address within the first IP address of the host, and the other parameters bound with the TCP/IP connection are unchanged. With the above improvement, all parameters bound with the TCP/IP connection do not change due to the host roaming. In this way, in the present disclosure, when the host roams from the first network to a second network, since all the parameters bound with the TCP/IP connection are unchanged, the TCP/IP connection is maintained. A reference may be made to block 102 for details.

At block 102, when the host roams from the first network to the second network, the host maintains the TCP/IP connection, obtains a second IP address of the host in the second network, and notifies the opposite end of the second IP address or a changed portion of the second IP address compared to the first IP address.

The second IP address is an IP address of the host in the second network and includes a network address and the host address. The network address indicates a network segment where the host is located, and the host address indicates a device identifier of the host for uniquely identifying the host. Thus, for the same host, the host address within the second IP address of the host is the same as the host address within the first IP address of the host, and the network address within the second IP address of the host may be different from the network address within the first IP address of the host. The network address within the second IP address of the host may be a new network address.

In the present disclosure, with the above improvement, a TCP/IP connection established between the host and the opposite end is modified from binding the first IP address of the host in the first network to binding the host address of the first IP address, so that all parameters binding with the TCP/IP connection established between the host and the opposite end are not changed when the host roams from the first network to the second network. Thus, even the host roams from the first network to the second network, the TCP/IP connection established between the host and the opposite end may be still continued. Therefore, it is ensured that the TCP/IP connection established by the host before roaming will not be interrupted due to the host roaming, thereby allowing the host to maintaining uninterrupted communication after the roaming.

Thus, descriptions of the flow shown in FIG. 1 is completed.

As can be seen from FIG. 1, in the present disclosure, the TCP/IP connection established between the host and the opposite end is modified from binding the IP address which changes due to the host roaming to binding the host address which does not change due to the host roaming, so that the TCP/IP connection established between the host and the opposite end can be still continued even the host roams from the first network to the second network. Therefore, it is ensured that the TCP/IP connection established by the host before roaming will not be interrupted due to the host roaming, thereby allowing the host to maintaining uninterrupted communication after the roaming.

In the present disclosure, after the host roams from the first network to the second network, since the network address within the first IP address of the host does not belong to an IP address segment corresponding to the second network, it is required to obtain a second IP address of the host in the second network. In the present disclosure, the first IP address and the second IP address are named only for convenience of descriptions rather than limitations.

Figure 2:
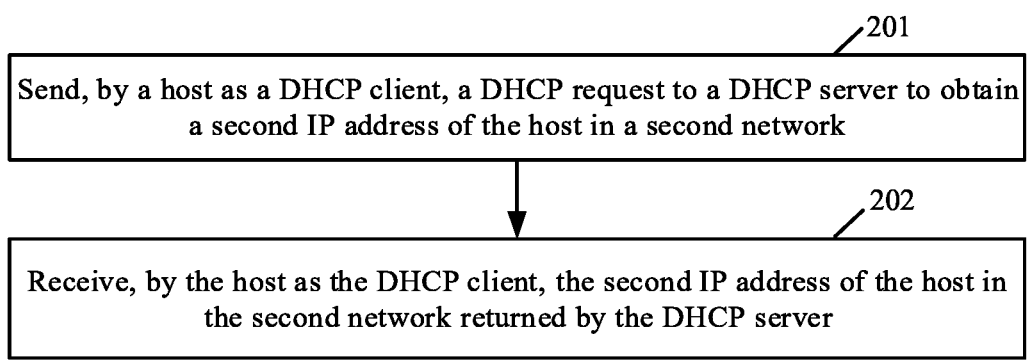
FIG. 2 is a flowchart illustrating obtaining a second IP address of a host in a second network according to the present disclosure.

In an example of the present disclosure, the second IP address of the host in the second network may be obtained based on a Dynamic Host Configuration Protocol (DHCP), which is briefly illustrated in FIG. 2.

FIG. 2 is a flowchart illustrating obtaining a second IP address of a host in a second network according to the present disclosure. As shown in FIG. 2, the flow may include the following blocks.

At block 201, the host, as a DHCP client, sends a DHCP request to a DHCP server to obtain the second IP address of the host in the second network.

In an example, the DHCP request may be a Discover packet in the DHCP.

At block 202, the host, as the DHCP client, receives the second IP address of the host in the second network which is returned by the DHCP server.

Thus, descriptions of the flow shown in FIG. 2 is completed.

With the flow shown in FIG. 2, the host may obtain the second IP address of the host in the second network.

In an example, as shown at block 102, after the IP address of the host is modified from the first IP address to the second IP address, the second IP address may be notified to the opposite end, so that the opposite end modifies the recorded IP address of the host from the first IP address to the second IP address. In this way, normal communication of the host in the second network is maintained.

In an example, instead of using a specific packet, the second IP address may be notified to the opposite end with a packet which the host may originally send to the opposite end.

Notifying the opposite end of the second IP address as described at the block 102 includes: notifying the opposite end of the second IP address with a data packet or a TCP/IP protocol packet sent by the host to the opposite end, where a source IP address of the data packet or the TCP/IP protocol packet is the second IP address.

After receiving a packet, the opposite end may find that a source IP address of the packet is a second IP address which is different from a first IP address recorded locally, then the opposite end directly modifies the locally-recorded first IP address to the second IP address.

In another example, after the IP address of the host is modified from the first IP address to the second IP address, as described at block 102, a portion of the second IP address which is different from the first IP address may be notified to the opposite end. The changed portion of the second IP address compared to the first IP address refers to the network address within the second IP address.

In an example, the changed portion of the second IP address compared to the first IP address may be notified to the opposite end with a TCP/IP protocol packet. Thus, notifying the changed portion of the second IP address compared to the first IP address to the opposite end as described at the block 102 may include: notifying the opposite end of the changed portion with the TCP/IP protocol packet.

In an example, the TCP/IP protocol packet may be one of an acknowledgement (ACK) packet, a request (REQ) packet, a negative acknowledgement (NAK) packet, and so on in the TCP/IP.

It is noted that, as an example, the foregoing first IP address and second IP address may both be IPv6 addresses.

The above are descriptions of the method of the present disclosure. The method of the present disclosure will be further described below based on an application with a satellite communication environment. In a case of satellite communication environment, a satellite in charge of communication in space has a fixed IP network segment. According to the method of the present disclosure, the TCP/IP connection between the satellite and a ground terminal is no longer bound with an IP address of the satellite, but is bound with a device identifier of the satellite. Thus, when the satellite moves quickly, the TCP/IP connection between the satellite and the ground terminal is not interrupted due to the movement of the satellite, thereby improving the routing efficiency of the satellite in space.

Similarly, even the IP address of the ground terminal changes, since the TCP/IP connection does not change during the IP address changing of the ground terminal, communication with the ground terminal is not interrupted.

An apparatus of the present disclosure will be described below.

Figure 3:
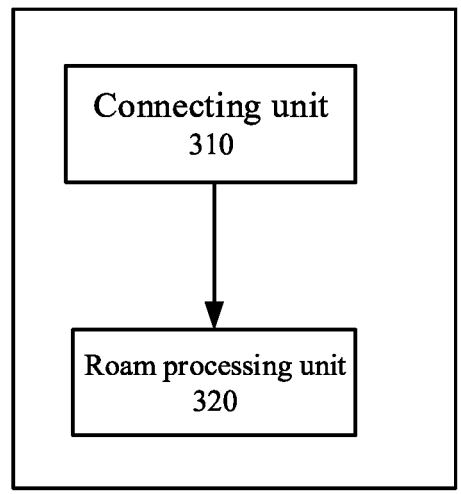
FIG. 3 is a structural diagram of an apparatus according to the present disclosure.

FIG. 3 is a structural diagram of an apparatus according to the present disclosure. The apparatus may be applied to a host and include a connecting unit 310 and a roam processing unit 320.

The connecting unit 310 is configured to bind a TCP/IP connection established between the host and an opposite end with a host address within a first IP address, so that the TCP/IP connection is maintained when the first IP address changes due to the host roaming from a first network to a second network, where the first IP address is an IP address of the host in the first network and includes a network address and the host address, the network address indicates a network segment where the host is located, and the host address indicates a device identifier of the host for uniquely identifying the host. And the connecting unit 310 is further configured to maintain the TCP/IP connection when the host roams from the first network to the second network.

The roam processing unit 320 is configured to obtain a second IP address of the host in the second network and notify the opposite end of the second IP address or a change portion of the second IP address compared to the first IP address when the host roams from the first network to the second network. The second IP address is an IP address of the host in the second network and comprises a network address and the host address In an example, the roam processing unit 320 notifies the opposite end of the second IP address, including: notifying the opposite end of the second IP address with a data packet or a TCP/IP protocol packet sent by the host to the opposite end, where a source IP address of the data packet or the TCP/IP protocol packet is the second IP address.

In an example, the roam processing unit 320 notifies the opposite end of the change portion, including: notifying the opposite end of the change portion with a TCP/IP protocol packet, where the change portion of the second IP address compared to the first IP address indicates the network address comprised in the second IP address.

In an example, the roam processing unit 320 obtains the second IP address of the host in the second network, including: sending, by the host as a DHCP client, a DHCP request to a DHCP sever to obtain the second IP address of the host in the second network; and receiving the second IP address of the host in the second network returned by the DHCP server.

In an example, the first IP address and the second IP address are both IPv6 addresses.

Thus, the descriptions of the structure for the apparatus provided by the present disclosure are completed.

Figure 4:
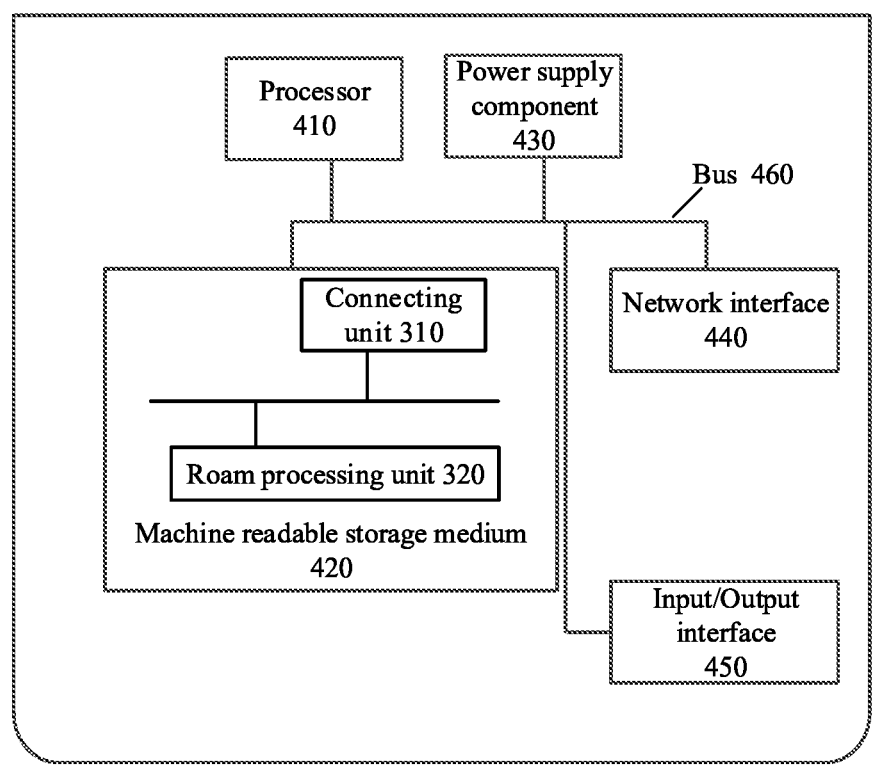
FIG. 4 is a schematic diagram illustrating a hardware structure of a host according to the present disclosure.

FIG. 4 is a schematic diagram illustrating a hardware structure of a host according to the present disclosure. As shown in FIG. 4, the hardware structure may include a machine readable storage medium 420 and a processor 410. The machine readable storage medium 420 is used for storing instructions. The processor 410 reads and executes the instructions stored in the machine readable storage medium 420 by communicating with the machine readable storage medium 420 to perform the roaming method disclosed in the above examples. The instructions may implement the functions of the connecting unit 310 and the roam processing unit 320 shown in FIG. 3.

Further, the apparatus shown in FIG. 4 may also include a power supply component 430, a network interface 440, and an input/output interface 450. Communication among the processor 410, the machine readable storage medium 420, the power supply component 430, the network interface 440 and the input/output interface 450 may be performed via a bus 460.

Thus, the descriptions of the hardware structure of the apparatus in FIG. 4 are completed.

The machine readable storage medium mentioned herein may be any of electronic, magnetic, optical or other physical storage devices and may contain or store information such as executable instructions, data and so on. For example, the machine readable storage medium may be a Radom Access Memory (RAM), a volatile memory, a non-volatile memory, a flash memory, a storage drive (e.g. hard disk drive), a solid state hard disk, any type of storage disk (e.g., compact disc or digital versatile disc), or a similar storage medium, or a combination thereof.

The invention claimed is:

1. A roaming method, the method being applied to a host, and comprising:
   binding a Transmission Control Protocol/Internet Protocol (TCP/IP) connection established between the host and an opposite end in a first network with a device identifier of the host within a first IP address, so that the TCP/IP connection between the host and the opposite end in the first network is maintained when the first IP address changes due to the host roaming from the first network to a second network, wherein
   the first IP address is an IP address of the host in the first network and comprises a network address and the device identifier of the host for uniquely identifying the host,
   the network address indicates a network segment where the host is located, and
   when the host roams from the first network to the second network, maintaining the TCP/IP connection between the host and the opposite end in the first network and obtaining a second IP address of the host in the second network, wherein the second IP address is an IP address of the host in the second network and comprises a network address and the device identifier of the host; and notifying the opposite end of the second IP address in the second network containing the device identifier of the host, wherein the TCP/IP connection established in the first network between the host and the opposite end in the first network is maintained in the second network by binding the TCP/IP connection to the device identifier of the host instead of binding the TCP/IP connection to the whole first IP address or binding the TCP/IP connection to the whole second IP address;

wherein obtaining the second IP address of the host in the second network comprises:

sending, by the host as a Dynamic Host Configuration Protocol (DHCP) client, a DHCP request to a DHCP sever to obtain the second IP address of the host in the second network; and receiving the second IP address of the host in the second network returned by the DHCP server.

2. The method according to claim 1, wherein notifying the opposite end of the second IP address comprises:

notifying the opposite end of the second IP address with a data packet or a TCP/IP protocol packet sent by the host to the opposite end, wherein a source IP address of the data packet or the TCP/IP protocol packet is the second IP address.

3. The method according to claim 2, wherein the first IP address and the second IP address are both IPv6 addresses.

4. The method according to claim 1, wherein the first IP address and the second IP address are both IPv6 addresses.

5. The method according to claim 1, wherein the first IP address and the second IP address are both IPv6 addresses.

6. The method according to claim 1, wherein the first IP address and the second IP address are both IPv6 addresses.

7. A host, comprising:

a processor, and a machine readable storage medium storing machine executable instructions run on the processor, wherein the processor is caused by executing the instructions to:

bind a TCP/IP connection established between the host and an opposite end in a first network with a device identifier of the host within a first IP address, so that the TCP/IP connection between the host and the opposite end in the first network is maintained when the first IP address changes due to the host roaming from the first network to a second network, wherein the first IP address is an IP address of the host in the first network and comprises a network address and the device identifier of the host for uniquely identifying the host, the network address indicates a network segment where the host is located, and when the host roams from the first network to the second network, maintain the TCP/IP connection between the host and the opposite end in the first network and obtain a second IP address of the host in the second network, wherein the second IP address is an IP address of the host in the second network and comprises a network address and the device identifier of the host; and notify the opposite end of the second IP address in the second network containing the device identifier of the host, wherein the TCP/IP connection established in the first network between the host and the opposite end in the first network is maintained in the second network by binding the TCP/IP connection to the device identifier of the host instead of binding the TCP/IP connection to the whole first IP address or binding the TCP/IP connection to the whole second IP address;

wherein the processor is caused to obtain the second IP address of the host in the second network by the following operations comprising:

sending, by the host as a Dynamic Host Configuration Protocol (DHCP) client, a DHCP request to a DHCP sever to obtain the second IP address of the host in the second network; and receiving the second IP address of the host in the second network returned by the DHCP server.

8. The host according to claim 7, wherein the processor is caused to notify the opposite end of the second IP address by the following operations comprising:

notifying the opposite end of the second IP address with a data packet or a TCP/IP protocol packet sent by the host to the opposite end, wherein a source IP address of the data packet or the TCP/IP protocol packet is the second IP address.

9. The host according to claim 8, wherein the first IP address and the second IP address are both IPv6 addresses.

10. The host according to claim 7, wherein the first IP address and the second IP address are both IPv6 addresses.

11. The host according to claim 7, wherein the first IP address and the second IP address are both IPv6 addresses.

12. The host according to claim 7, wherein the first IP address and the second IP address are both IPv6 addresses.

* * * * *